United States Patent [19]

Green

[11] Patent Number: 5,427,486
[45] Date of Patent: Jun. 27, 1995

[54] ADJUSTABLE LOAD SECURING DEVICE FOR VEHICLES

[76] Inventor: Gerald D. Green, 9749 Paseo Montril, San Diego, Calif. 92129

[21] Appl. No.: 214,227

[22] Filed: Mar. 17, 1994

[51] Int. Cl.[6] .............................................. B60P 7/14
[52] U.S. Cl. ................................... 410/118; 296/24.1; 410/117; 410/129; 410/151
[58] Field of Search ................. 410/96, 129, 117, 151, 410/118; 160/332, 351; 296/24.1, 50, 37.1; 280/749

[56] References Cited

U.S. PATENT DOCUMENTS

| | | | |
|---|---|---|---|
| 2,594,208 | 4/1952 | Pilot | 410/129 |
| 2,697,631 | 12/1954 | Miller | 296/28 |
| 3,782,758 | 1/1974 | Williamson, III | 410/118 |
| 4,215,895 | 8/1980 | Phillips | 280/749 X |
| 4,396,325 | 8/1983 | Joice-Cavanagh | 410/129 |
| 4,507,033 | 3/1985 | Boyd | 410/104 |
| 4,733,899 | 3/1988 | Keys | 296/24 |
| 4,763,944 | 8/1988 | Fry et al. | 296/50 |
| 4,781,498 | 11/1988 | Cox | 410/118 |
| 4,834,599 | 5/1989 | Gordon et al. | 410/151 |
| 4,874,028 | 10/1989 | Lynch et al. | 160/332 |
| 4,875,730 | 10/1989 | Justice | 296/37.5 |
| 5,090,856 | 2/1992 | Moore | 410/117 X |
| 5,207,260 | 5/1993 | Commerro | 410/118 X |
| 5,253,913 | 10/1993 | Metiuier | 296/24.1 X |

FOREIGN PATENT DOCUMENTS 2191800 12/1987 United Kingdom ............... 410/151

OTHER PUBLICATIONS

American Vans Catalog, p. 25, see "Our new heavy duty Load-Lock".
Load Hugger Cargo Net Installation, Load Hugger Corporation advertisement.

Primary Examiner—Michael S. Huppert
Assistant Examiner—Stephen Gordon
Attorney, Agent, or Firm—Brown, Martin Haller & McClain

[57] ABSTRACT

An adjustable barrier device for securing a partial load in a load-carrying area of a vehicle has a rectangular panel of compressible material and at least two spaced, upper and lower elongate members of adjustable length extending across the width of the panel and attached to it. Each elongate member has feet for gripping engagement with opposite side walls of a load-carrying area when the elongate member is adjusted in length to fit across the area.

15 Claims, 3 Drawing Sheets

ADJUSTABLE LOAD SECURING DEVICE FOR VEHICLES

BACKGROUND OF THE INVENTION

This invention relates to an adjustable load securing device for vehicles having extended, load-carrying areas such as pickup trucks, vans and station wagons which have open or enclosed cargo compartments.

When such vehicles are carrying only a partial load, the load may move around during vehicle turns, acceleration and braking, potentially causing damage to the load itself or the load-carrying area of the vehicle. Thus, various devices have been proposed in the past for securing partial loads in pickup trucks, vans and the like. These are often not particularly versatile and often require modification of the vehicle body itself. For example, in U.S. Pat. No. 4,507,033 of Boyd, side rails are attached to the side walls of a truck bed and retainers or solid partitions are movable along the side rails to secure a load. U.S. Pat. No. 4,875,730 describes a truck bed having cut-outs in which barrier panels are mounted and which may be deployed into an upright position as needed.

U.S. Pat. No. 4,733,899 of Keys describes a pickup truck bed divider device which comprises a flat support plate carrying a vertical baffle. The flat support plate extends across the truck bed and abuts the wheel well.

SUMMARY OF THE INVENTION

It is an object of the present invention to provide a new and improved load securing device for securing partial loads in load-carrying areas in pickup trucks, vans and other vehicles.

According to the present invention, a load securing device is provided which comprises a generally rectangular panel of collapsible material having upper and lower edges and opposite side edges, at least one upper elongate member extending across an upper portion of the panel adjacent the upper edge, and a lower elongate member extending across the lower edge of the panel or a portion of the panel adjacent the lower edge, each of the elongate members being adjustable in length for fitting transversely across a load-carrying area of a vehicle between the opposite side walls of the area, and the panel being attached to the upper and lower elongate members, respectively.

The upper elongate member is designed to be adjustable in length to accommodate load-carrying areas of varying width, while the lower elongate member is designed to be adjustable over a wider range of lengths so that it can span the full width of a load carrying area or span the reduced distance between the wheel wells of a pickup truck or van. Preferably, each of the elongate members is a spring-loaded tension bar or rod of the type generally used for shower curtain rods and the like, and will be biassed by the internal spring against the opposite side walls of the truck or the opposite faces of the wheel wells. This arrangement allows the securing device to be positioned anywhere along the length of the load-carrying area of the truck, van or other vehicle so that loads of varying dimensions may be secured both quickly and easily. The adjustment rods preferably have non-slip feet attached at each end.

The panel is preferably of webbing or mesh material, and may be of nylon webbing with pockets through which the adjustment rods may be extended. The webbing may be of elasticized nylon cord over the entire area of the panel, or only in those regions which are collapsed over the wheel wells when the device is positioned at the wheel wells.

This arrangement allows a partial load of any size to be retained securely in a reduced area region of a truck bed or other load-carrying vehicle compartment. The device is inexpensive and simple in construction, and quick and easy to deploy at any position in the load-carrying compartment.

BRIEF DESCRIPTION OF THE DRAWINGS

The invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

FIGS. 1–4 illustrate an adjustable load securing device or barrier 10 according to a preferred embodiment of the invention for securing a partial load in a pickup truck bed or load carrying compartment of a vehicle such as a truck, van or station wagon. The load securing device basically comprises a rectangular panel 12 of collapsible material such as nylon webbing, and a series of three adjustable tension bars or rods 14,16,18 extending across the panel through spaced pockets or sleeves 20,22,24 provided across the width of the panel.

Figure 1:
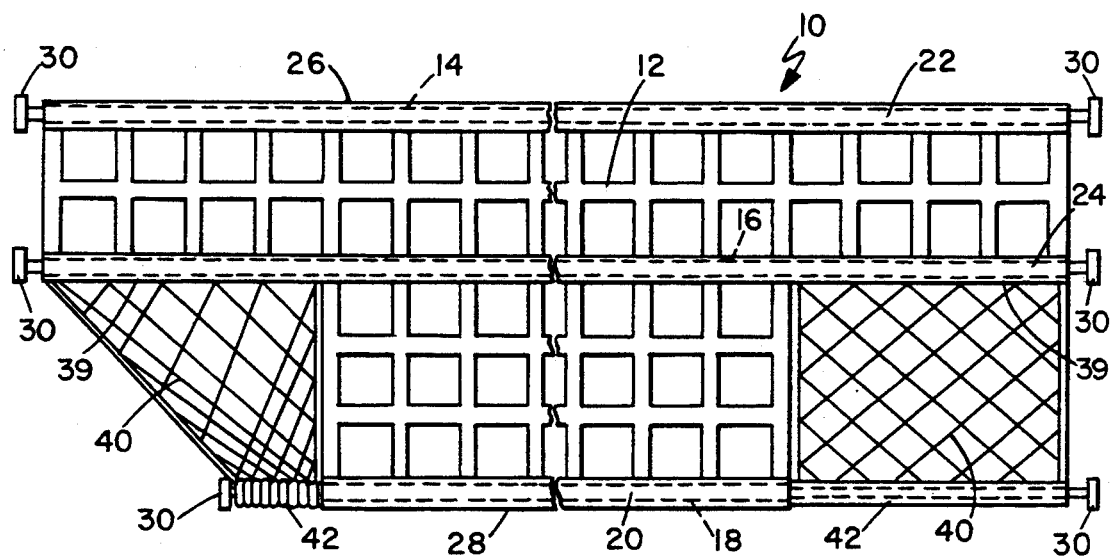
FIG. 1 is a front elevational view of a barrier device according to a first embodiment of the invention.
Figure 2:
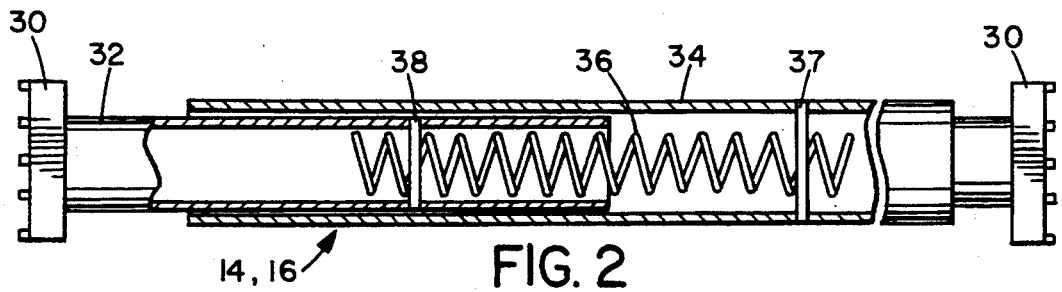
FIG. 2 is a side elevation view, partially in section, of one of the adjustable tension bars of FIG. 1.

The tension bars include an upper tension bar 14 extending across the upper edge 26 of the panel, an intermediate tension bar 16 extending across an intermediate portion of the panel, and a lower tension bar 18 extending across the lower edge 28 of the panel. Each bar projects out through opposite ends of the respective sleeve, and has an enlarged foot 30 at each end. Each foot has a non-slip or treaded outer surface, and may suitably be of rubber or other non-slip material. Each bar is an adjustable tension bar of the type generally used for curtain rods or the like, and is constructed as illustrated in FIG. 2 of inner and outer telescoping, concentric metal or plastic tubes 32,34. A spring 36 extends within the tubes and is secured at one end to the outer tube via pin 37. A spring threading pin 38 extends through the spring in the inner tube, so that the length of the bar can be adjusted by rotating the inner tube relative to the outer tube, and the bar will be biassed by the spring when compressed from its adjusted length. Other types of locking mechanism may alternatively be used in place of pin 37, such as a gear tooth locking device releasable with a push button, for example.

The panel is formed of nylon or plastic, non-elastic webbing over most of its area, with two cut-out areas 39 at the lower corners of the panel in which inserts 40 of elasticized nylon webbing are secured by sewing or the like. Compressible nylon sleeves 42 are secured across the lower edges of inserts 40, and the opposite ends of the lower adjustment bar 18 extend through the sleeves 42. The lower adjustable bar 18 is designed to be adjustable in length from the fully extended position illustrated in FIG. 3 and the right hand side of FIG. 1 to the compressed position illustrated in FIG. 4 and on the left hand side of FIG. 1. In the compressed position, the bar compresses the sleeves 42 and the elasticized inserts 40.

Figure 3:
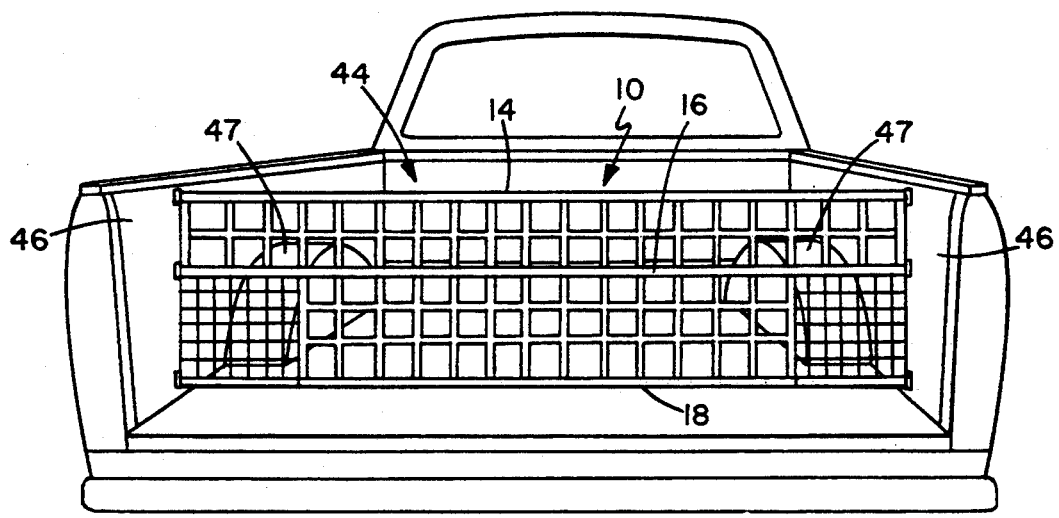
FIG. 3 is a rear elevation view illustrating the barrier device installed at a first position in a pickup truck bed.
Figure 4:
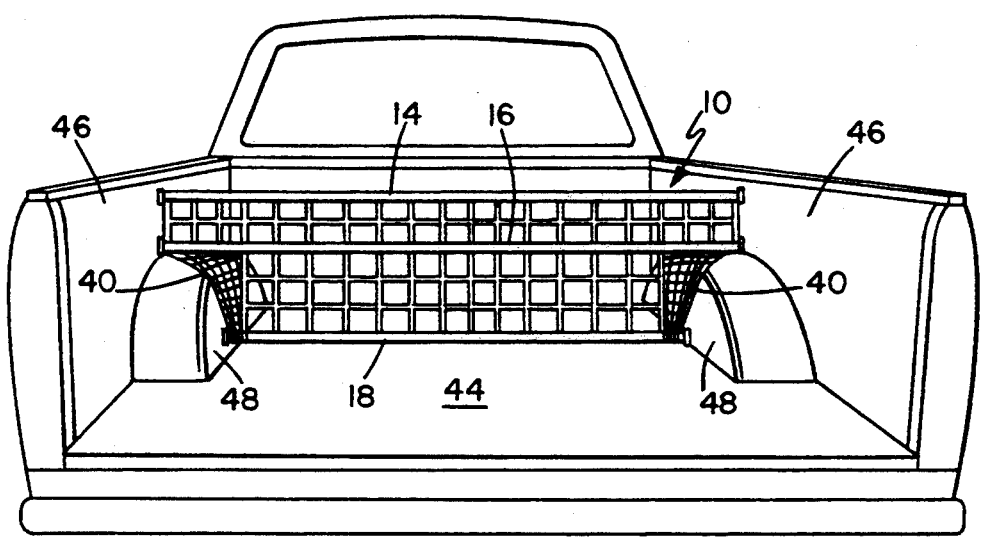
FIG. 4 is a rear elevation view illustrating the barrier device installed at a second position in a pickup truck bed.

The load securing device 10 can be quickly positioned to secure a partial load in a truck bed 44 or other load carrying compartment of a vehicle, as illustrated in FIGS. 3 and 4. From either side of the vehicle, the operator locates the non-skid foot of the upper adjustment bar against the opposite side wall 46 of the truck bed at the desired position along the length of the truck bed. The end of the bar nearest the operator is then rotated to adjust the bar length to slightly longer than the bed width, and the bar is compressed to fit between the opposite side walls. Thus, the opposite feet will be spring loaded against the side walls and held securely in position. The intermediate and lower tension bars are positioned in the same way.

When the device is to be positioned at a location spaced from the wheel wells 47, as illustrated in FIG. 3, the three tension bars will each be adjusted to about the same length in order to span the full width of the truck bed and secure the panel across the truck bed. However, if the device is to be positioned across the truck at the location of the wheel wells, the lower tension bar is adjusted so as to extend between the opposing inner faces 48 of the wheel wells, as illustrated in FIG. 4. The elasticized panels 40 will stretch and conform to the shape of the wheel wells, and the intermediate tension bar will extend across the truck at a location just above the wheel wells. Thus, the device can be located securely at any position in the length of the truck bed, including across the wheel wells, allowing any size partial load to be secured. The elasticized inserts or sections 40 will ensure that the panel fits closely around the wheel wells with no gaps for loose items in a load to escape.

The upper tension bars 14 and 16 are designed to be adjustable in length so that they can span the width of the load carrying bed or compartment of various different types of vehicle. The lower tension bar 18 is designed to adjust between the maximum truck bed width and the width between the wheel wells, and will therefore have a longer and stronger internal spring.

Truck beds of different vehicles vary in width from around 52 inches to around 70 inches, while the wheel well width varies from about 7 to 10 inches (so that the width between the wheel wells will be between 14 and 20 inches less than the maximum bed width). The height of the truck bed also varies from around 15.5 to 19 inches. The insert panel sections 40 have a height and width slightly greater than that of a wheel well, and are typically around 10 or 11 inches square. The barrier device may be made in two different sizes, one for fitting larger trucks and vans and the other for smaller vehicles. The smaller device will have a fully extended width of 58 inches, while the larger device has a fully extended width of around 70 inches. The height of the smaller device will be around 16 inches while that of the larger device will be around 18 inches.

Figure 5:
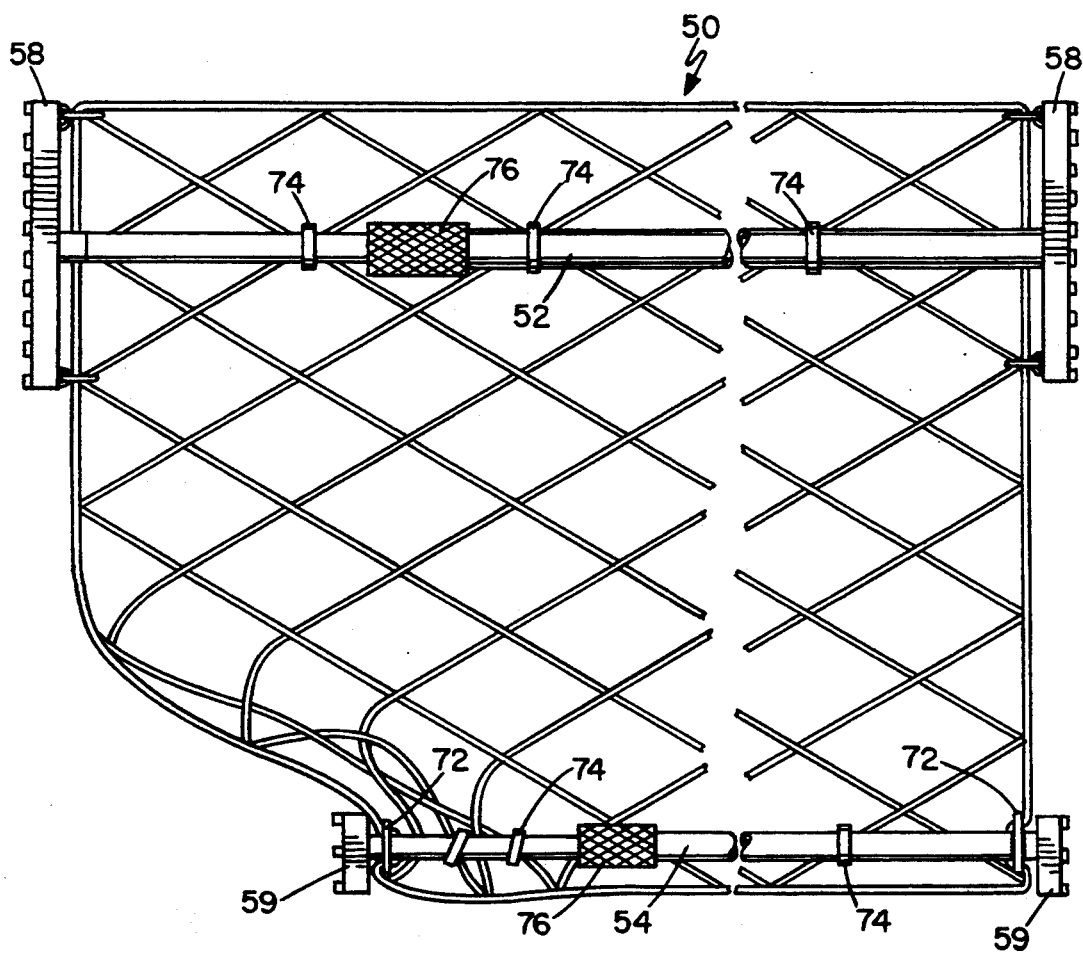
FIG. 5 is a front elevation view, partially broken away, of a modified barrier device according to a second embodiment of the invention.
Figure 6:
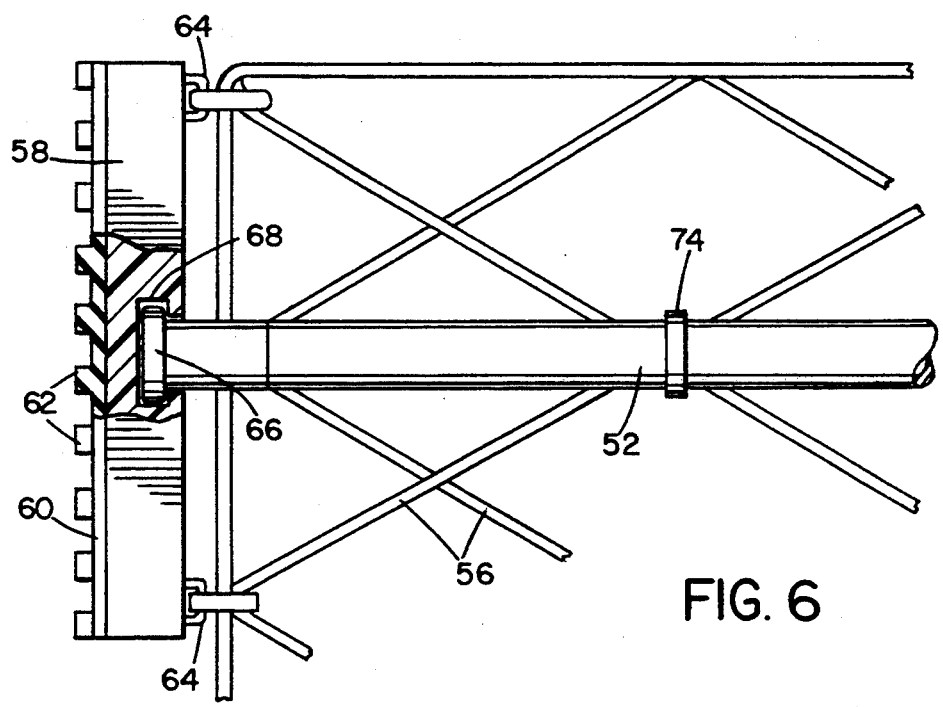
FIG. 6 is an expanded, partially sectioned view of a corner portion of the device of FIG. 5.

FIG. 5 illustrates a modified load securing device 50 in which only two tension bars, upper bar 52 and lower bar 54, are used and in which the entire panel 56 is of elasticized, "bungee"-type, nylon cord mesh, rather than only the two panel inserts 40 as in the previous embodiment. This will have the advantage of more flexibility than the previous embodiments. Instead of having an upper bar extending across the upper edge of the panel and an intermediate bar for extending across the panel above the wheel wells, a single upper bar 52 extends across the panel at a location between these two positions, and has enlarged feet 58 at its opposite ends for security when the device is located above a wheel well. As in the previous embodiment, the lower bar 54 has feet 59. The enlarged, gripping feet 58 have an outer gripping surface 60 having treads 62 similar to tire treads for gripping against the side wall of the truck bed. The webbing of panel 56 is attached to feet 58 via attachment loops 64 at the upper and lower edges of the feet, as illustrated in FIG. 6. The webbing will therefore be expanded with the bar 52. Because of this, the bar 52 must be rotatably mounted in one of the feet at one end of the bar, as illustrated in FIG. 6, so that the bar can be rotated for length adjustment without twisting the mesh or webbing of the panel.

The bar 52 has an enlarged head 66 at one end which is rotatably engaged in a correspondingly shaped recess 68 in the inner face 69 of foot 58. The opposite end of the bar will be rigidly connected to the opposite foot in any appropriate manner. Each foot is preferably around 6 to 7 inches in height and around 2 inches in width. It may be of plastic material with a surface layer of rubber tread material.

Figure 7:
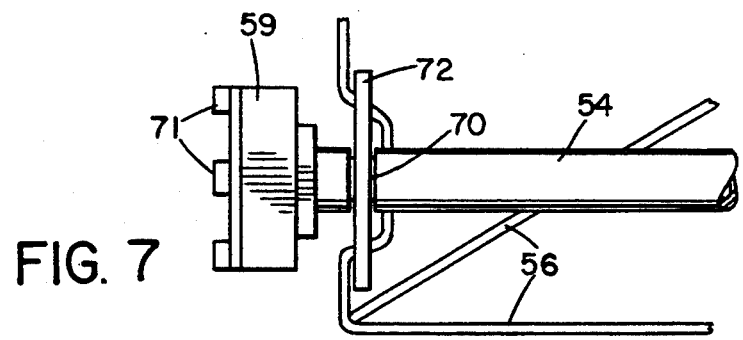
FIG. 7 is an expanded view of another corner portion of the device of FIG. 5.

FIG. 7 illustrates the attachment of the lower edge of the panel to the lower bar 54 so that the panel can be stretched as the bar is adjusted in length while at the same time the bar can be freely rotated without twisting the panel. The inner or smallest diameter tube of bar 54 has an annular groove 70 adjacent one end in which a ring shaped collar 72 secured to the panel is rotatably engaged. The panel may be permanently secured to the foot or bar at the end remote from that illustrated in FIG. 8, which does not have to be rotated. Each foot has an outer, non-slip tread surface 71 similar to that of feet 58. Each of the bars 52 and 54 may be loosely secured to the panel at spaced intervals along their length by loops 74 or the like formed or attached to the panel, with the bars extending through the loops as generally illustrated in FIG. 5. Each adjustment bar preferably has a suitable adjustment grip or collar 76 adjacent the adjustment end for ease in rotating the smaller diameter tube.

As in the previous embodiment, the barrier device 50 can be adjusted to extend across the entire width of a truck bed or load-carrying area, in which case the lower adjustment bar will be in an extended position as illustrated on the right-hand side of FIG. 5. If the device is located at the wheel wells, the lower bar will be compressed as illustrated at the left in FIG. 5 to fit between the wheel wells. The panel itself will be compressed around the wheel wells.

Figure 8:
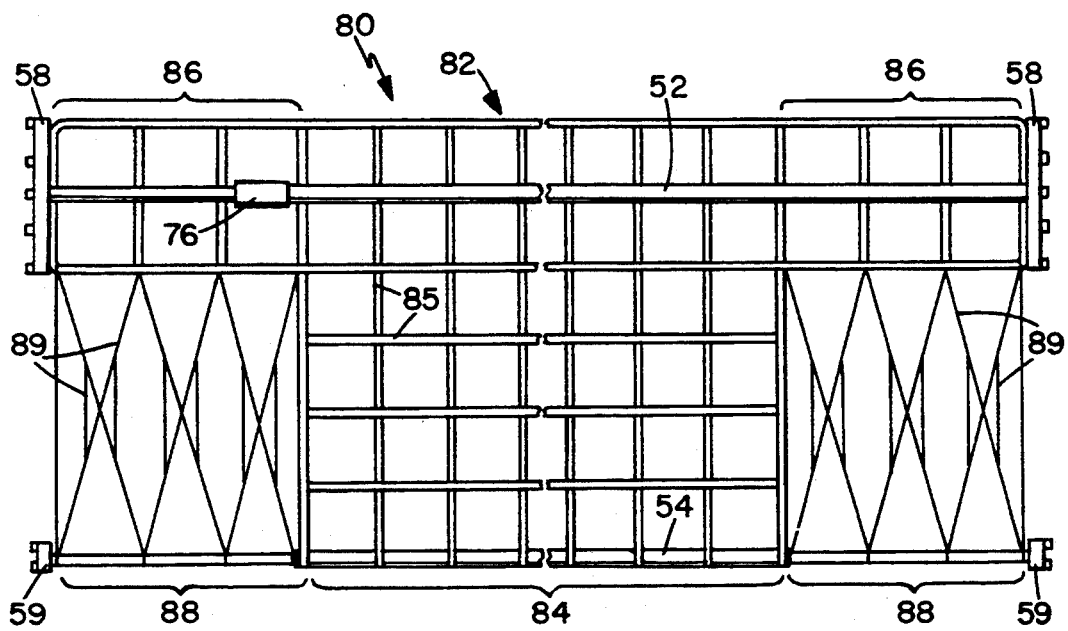
FIG. 8 is a front elevational view illustrating another modified barrier device.

FIG. 8 illustrates a load securing device or barrier 80 according to another embodiment of the invention. In this embodiment, the upper and lower adjustment bars 52,54 are identical to the previous embodiment and like reference numerals have been used as appropriate. However, the panel 82 in this embodiment is modified. Rather than using elasticized webbing over the entire panel, in this embodiment a central portion 84 of the panel is of non-elastic nylon web strapping 85 or similar material. Each end portion of the panel has an upper section 86 of elasticized nylon web 87, and a lower section 88 similar to section 40 in the first embodiment for taking the contour of a fender or wheel well which is of elasticized nylon or "bungee"-type cord 89. The panel 82 is secured to the adjustment bars 52,54 in the same way as in the previous embodiment.

In each of the above embodiments, a load of any partial size can be secured by extending an adjustable barrier device across the width of the truck bed at the end of the load. The adjustable, spring-loaded tension bars secure the device in any selected position in the truck bed, while the barrier panel extending between the bars secures the load in position. The panel has elasticized portions at least at the lower corners so that it can conform to the shape of the wheel wells when it is positioned across the truck at the wheel wells, leaving no gaps for items to escape the confined area.

Although some preferred embodiments of the invention have been described above by way of example only, it will be understood by those skilled in the field that modifications may be made to the disclosed embodiments without departing from the scope of the invention, which is defined by the appended claims.

I claim:

1. An adjustable barrier device for securing a partial load in a load carrying area of a vehicle, comprising:
   a rectangular panel of compressible material having an upper edge, a lower edge and opposite side edges;
   at least two spaced, upper and lower elongate members extending across the width of the panel between its opposite side edges, each elongate member having adjustment means for adjusting the length of said member, each elongate member having opposite ends projecting out beyond the respective side edge of the panel, each end of each of the elongate members comprising a foot;
   attachment means for attaching said panel to said elongate members;
   said adjustable elongate members comprising means for fitting transversely across the width of a vehicle load-carrying area at any selected position in the length of the load-carrying area and said feet comprising means for gripping engagement with opposing portions of side walls of the load-carrying area; and
   the upper elongate member feet having a larger surface area than the feet of the lower elongate member.

2. The device as claimed in claim 1, wherein the lower elongate member is adjustable in length between a predetermined maximum length for fitting transversely across a maximum transverse width of a vehicle load-carrying area and a predetermined minimum length for fitting transversely between vehicle wheel wells in a load-carrying area.

3. The device as claimed in claim 1, wherein each elongate member is a spring-loaded tension bar.

4. The device as claimed in claim 1, wherein each foot has an outer gripping surface for contacting a side wall of the vehicle, the gripping surface having treads.

5. The device as claimed in claim 1, wherein said attachment means comprises an upper and a lower series of spaced loops extending across the width of the panel, and wherein said upper and lower elongate members extend through said upper and lower series of spaced loops, respectively.

6. The device as claimed in claim 1, wherein the panel is secured to the opposite ends of each elongate member.

7. The device as claimed in claim 2, wherein the upper elongate member is adjustable in length between a predetermined maximum length and a predetermined minimum length, the minimum length of the lower elongate member being less than the minimum length of the upper elongate member.

8. An adjustable barrier device for securing a partial load in a load carrying area of a vehicle, comprising:
   a rectangular panel of material having an upper edge, a lower edge, and opposite side edges, the upper and lower edges being longer than the side edges;
   at least two spaced, upper and lower elongate members extending across the entire width of the panel between its opposite side edges, each elongate member having opposite ends projecting outwardly from the respective opposite side edges of the panel, each end of each of the elongate members comprising a foot for gripping engagement with a side wall of a load carrying area of a vehicle, and each elongate member having adjustment means for adjusting the length of said member;
   said adjustable elongate members comprising means for fitting transversely across the width of a vehicle load-carrying area at any selected position in the length of the load carrying area with said feet in gripping engagement with opposing portions of side walls of the load-carrying area;
   attachment means for attaching the panel to the respective elongate members along the length of the respective members; and
   the panel having at least two lower corner regions which are of elastic material for selectively conforming to the outer periphery of opposite wheel wells of a vehicle load-carrying area when the panel is positioned across the load-carrying area at the wheel wells, each lower corner region being distinct from the remainder of the panel, noninclusive of the lower corner regions.

9. The device as claimed in claim 8, including three spaced elongate members extending transversely across the width of the panel, comprising the upper elongate member, the lower elongate member, and an intermediate elongate member located between the upper and lower members, the intermediate member being positionable above the wheel wells when the device is located at the wheel wells of a load-carrying area.

10. The device as claimed in claim 8, wherein at least the area of the panel not inclusive of the lower corner regions is of an open netting material having a plurality of openings across the netting.

11. The device as claimed in claim 8, wherein the lower corner regions are of elasticized nylon webbing.

12. The device as claimed in claim 8, wherein at least the area of the panel not inclusive of the lower corner regions is of openwork netting material comprising a plurality of elasticized cross members with openings between the cross members.

13. The device as claimed in claim 8, including at least an upper and a lower transverse, tubular sleeve, said sleeves comprising said attachment means, and wherein said upper and lower elongate members extend through said upper and lower sleeves, respectively.

14. An adjustable barrier device for securing a partial load in a load carrying area of a vehicle, comprising:
- a rectangular panel of compressible material having an upper edge, a lower edge and opposite side edges;
- at least two spaced, upper and lower elongate members extending across the width of the panel between its opposite side edges, each elongate member having adjustment means for adjusting the length of said member, each elongate member having opposite ends projecting out beyond the respective side edge of the panel, each end of each of the elongate members comprising a foot;
- attachment means for attaching said panel to said elongate members;
- said adjustable elongate members comprising means for fitting transversely across the width of a vehicle load-carrying area at any selected position in the length of the load-carrying area and said feet comprising means for gripping engagement with opposing portions of side walls of the load-carrying area;
- the panel having at least two lower corner regions which are of elasticized material for conforming to the outer periphery of opposite wheel wells when the panel is positioned across the load-carrying area at the wheel wells; and
- the panel having cut-outs at the two lower corners and the two lower corner regions comprising insert portions of elasticized material secured in the cut-outs.

15. The device as claimed in claim 14, wherein the panel is of non-elastic webbing apart from said insert portions.

* * * * *